(12) United States Patent  (10) Patent No.: US 8,522,901 B1
VanLue  (45) Date of Patent: Sep. 3, 2013

(54) DUAL STEERING SYSTEM FOR ZERO TURNING RADIUS MOWER

(76) Inventor: Timothy A. VanLue, Granby, MO (US)

( * ) Notice: Subject to any disclaimer, the term of this patent is extended or adjusted under 35 U.S.C. 154(b) by 0 days.

(21) Appl. No.: 13/603,080

(22) Filed: Sep. 4, 2012

(51) Int. Cl.
*B60K 17/30* (2006.01)

(52) U.S. Cl.
USPC .......... 180/6.32; 180/6.4; 180/6.34; 180/315; 180/19.3; 180/332; 56/10.8; 56/10.5; 56/10.4; 56/10.2 E; 56/15.2; 56/15.8; 56/17.1

(58) Field of Classification Search
USPC ............... 180/6.32, 6.4, 6.34, 315, 19.3, 332; 56/10.8, 10.5, 10.4, 10.2 E, 15.2, 15.8, 17.1
See application file for complete search history.

(56) References Cited

U.S. PATENT DOCUMENTS

| 4,395,865 | A | 8/1983 | Davis, Jr. et al. |
| 4,429,515 | A | 2/1984 | Davis, Jr. et al. |
| 5,644,903 | A | 7/1997 | Davis, Jr. |
| 7,849,941 | B2 * | 12/2010 | Bares et al. ................. 180/6.32 |
| 8,235,151 | B2 * | 8/2012 | Nunez et al. ................ 180/6.32 |
| 2002/0088217 | A1 * | 7/2002 | Dennis ........................... 56/15.8 |
| 2012/0167537 | A1 * | 7/2012 | Corriher ........................ 56/14.7 |

\* cited by examiner

*Primary Examiner* — Tashiana Adams
*Assistant Examiner* — Marlon Arce
(74) *Attorney, Agent, or Firm* — Hovey Williams LLP (57) ABSTRACT

A dual steering system for zero turning radius lawn mowers is provided which enables those without effective use of their arms to drive and steer such lawn mowers. The system hereof may include respective left and right control pedals which are shiftably mounted to respective pedal supports coupled to the mower for use by the operator's legs, and respective linkages which operatively connect the pedals to left and right control levers operatively connected to the mower's drive wheels for causing the drive wheels to move in forward or rearward drive directions. By operating the control pedals alone or in combination with the control levers, the operator may move the zero turning radius mower forward, rearward, or steer it in a desired manner.

20 Claims, 10 Drawing Sheets

DUAL STEERING SYSTEM FOR ZERO TURNING RADIUS MOWER

BACKGROUND OF THE INVENTION

1. Field of the Invention

The present invention is concerned with steering systems for zero turning radius mowers. More particularly, it is concerned with a dual steering system which preferably enables steering to be accomplished by the operator using his or her aims, legs or both to provide steering input to a zero turning radius mower.

2. Description of the Prior Art

Mowing of vegetation on tracts of lands is a task familiar to many. Over the years, new systems have been developed for accomplishing this chore, from reel-type push mowers to motorized walk-behind mowers, and eventually mowers which are self-propelled and carry the operator, known as riding lawn mowers. Zero-turn riding lawn mowers (herein "zero turning radius mowers") represent an improvement in mower systems which are now well known to the public, and their development is usually traced to the early or mid 1960's. Zero turning radius mowers are ridden by the operator and provided with a drive and steering system which enables the mower to be driven and steered in tight turns and even to spin about a vertical axis positioned equidistant two drive wheels. Examples of zero turning radius mowers and steering systems therefor are shown in U.S. Pat. Nos. 4,395,865, 4,429,515 and 5,644,903, the disclosures of which are incorporated herein by reference in their entirety. Zero turning radius mowers thus present significant advantages over traditionally steered riding lawn mowers in that vegetation can be cut in a complete circle around trees, bushes or other vegetation not possible in a single pass by traditional riding lawn mowers having the steered wheels spaced forwardly or rearwardly of the driven wheels.

Zero turning radius mowers generally have at least four wheels, two of the wheels being laterally spaced independently driven drive wheels, and a cutting deck which includes one or more rotating cutting blades for cutting grass or other vegetation. An engine, typically an internal combustion engine, supplies power to both rotate the cutting blade or blades and to propel the driven wheels independently of one another. zero turning radius mower. Typically, the zero turning radius mower has left and right drive wheels which are parallel and spaced apart, and each is rotated independently of the other in forward or backward directions by respective hydraulic motors. Steering and speed control is effected by respective left and right manually operated control levers operatively coupled to their respective hydraulic motors. The operator propels the zero turning radius mower in the desired path by forward and backward movement of these control levers; for example, if the operator wishes to have the zero turning radius mower spin or pivot in a clockwise direction about a vertical axis midway between the left and right drive wheels, the operator grasps the left control lever with his or her left hand and pushes the lever forward, while at the same time grasping the right control lever with his or her right hand pulling the right lever rearwardly.

Undoubtedly, zero turning radius mowers represent a significant advance in mowing technology. It has been recognized, however, that there are certain drawbacks. For example, during prolonged mowing, the operator's arms may experience fatigue. Heretofore, the solution to this drawback has been to provide a joystick or a steering wheel. This solution may provide some additional comfort, but does not address problems considered and solved by the present invention.

SUMMARY OF THE INVENTION

The present invention provides a solution to a problem not previously considered—how to operate a zero turning radius mower without having to grasp the left and right control arm levers. That is, the present invention provides a solution to a problem not previously considered—how can a user who is unable to use one or both aims or hands able to competently operate a zero turning radius mower. The inventor is a double-arm amputee. By conceiving of the challenge he faced, as well as those suffering from arthritis and other disabilities in operating a zero turning radius mower, the inventor has developed a solution which retains the normal operating functions of the zero turning radius mower but also allows for the use of the operators feet alone or using the operator's feet in combination with his or her arms in an arm-assist mode.

Broadly speaking, the present invention includes respective, independently-actuatable left and right foot pedals which are coupled by links to the respective left and right control levers used to drive and steer a zero turning radius mower. The foot pedals may be shiftable either along a substantially linear path, or more preferably pivotally coupled to respective left and right pivot mounts mounted to a platform deck of the mower. The pedals may include extensions to provide a greater degree of movement of the links in response to shifting, including pivotal movement, of the pedals. The links may advantageously be provided with an adjustable length feature in order to make the positioning of the pedals and control levers complement the height, leg length or other dimensions of the operator. Preferably, the connections between the links and the pedals and the control arms may include flexible couplings, such as ball-and-socket swivel mounts to avoid binding during shifting movement of the drive and control assembly.

The dual steering system of the present invention thus greatly enhances the ability of amputees and those suffering from impairments to successfully operate zero turning radius mowers. By applying a force to one of the pedals, the operator can cause consequent movement of the corresponding lever arm and cause rotation of the corresponding drive wheel to propel or steer the mower. By alternating and controlling the application of force applied by the operator's feet on the pedals, the zero turning radius mower can be effectively steered without the use of hand manipulation of the control levers. Even in circumstances where an operator enjoys the use of both arms and hands, the present invention allows compensation for fatigue in the arms or legs by permitting alternating use of the arms and hands. The present invention is thus particularly useful where different individuals may be operating the mower, in that it can be installed either at the factory or as an aftermarket accessory, and the mower retains full functionality of use in its original, arm-operation only mode.

These and other advantages will be appreciated by those skilled in the art with reference to the drawings and description which follow.
function. wishing to lead a productive life is unable through accident or infirmity

DESCRIPTION OF THE PREFERRED EMBODIMENT

Figure 1:
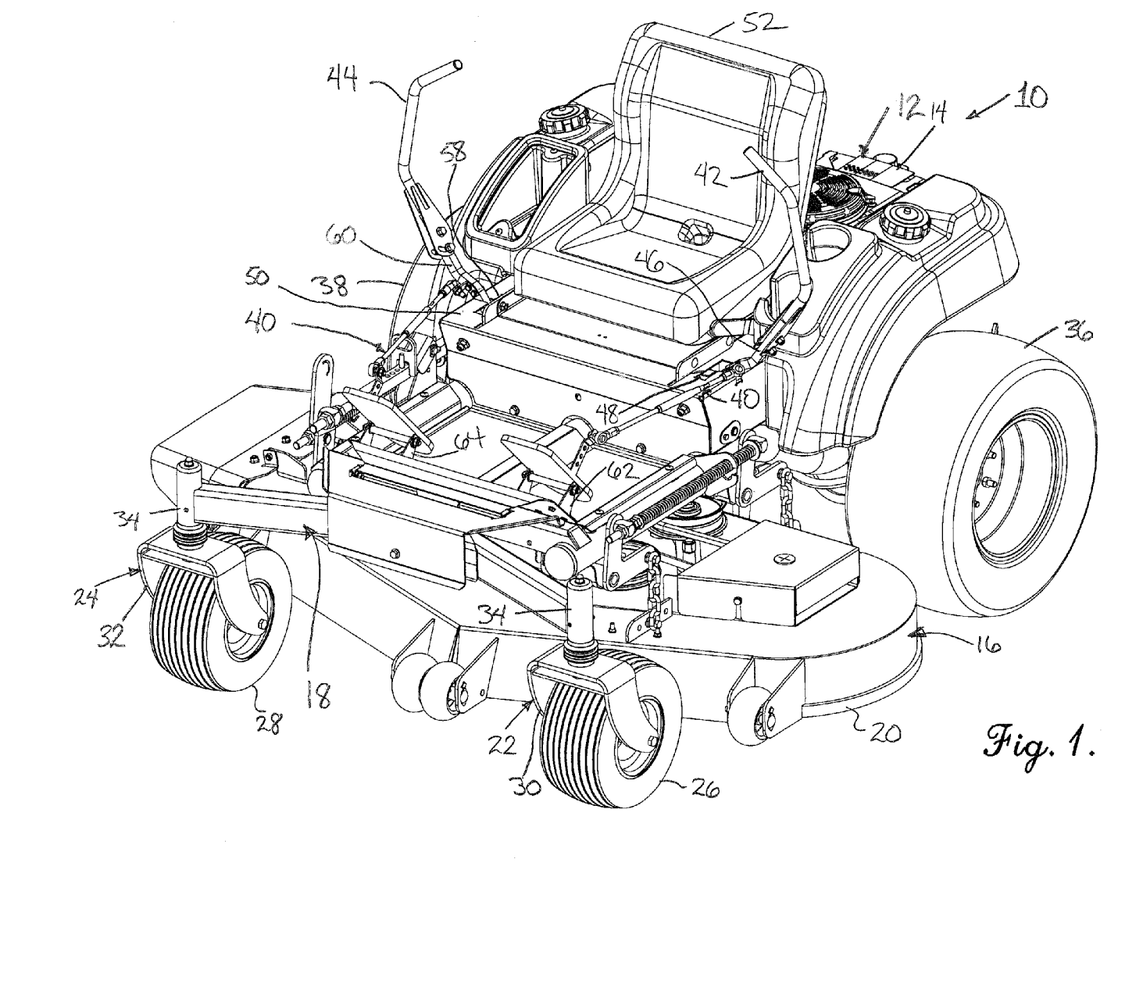
FIG. 1 is an isometric view of a zero turning radius mower showing the mower deck, wheels, engine and drive and steering system of the present invention.
Figure 2:
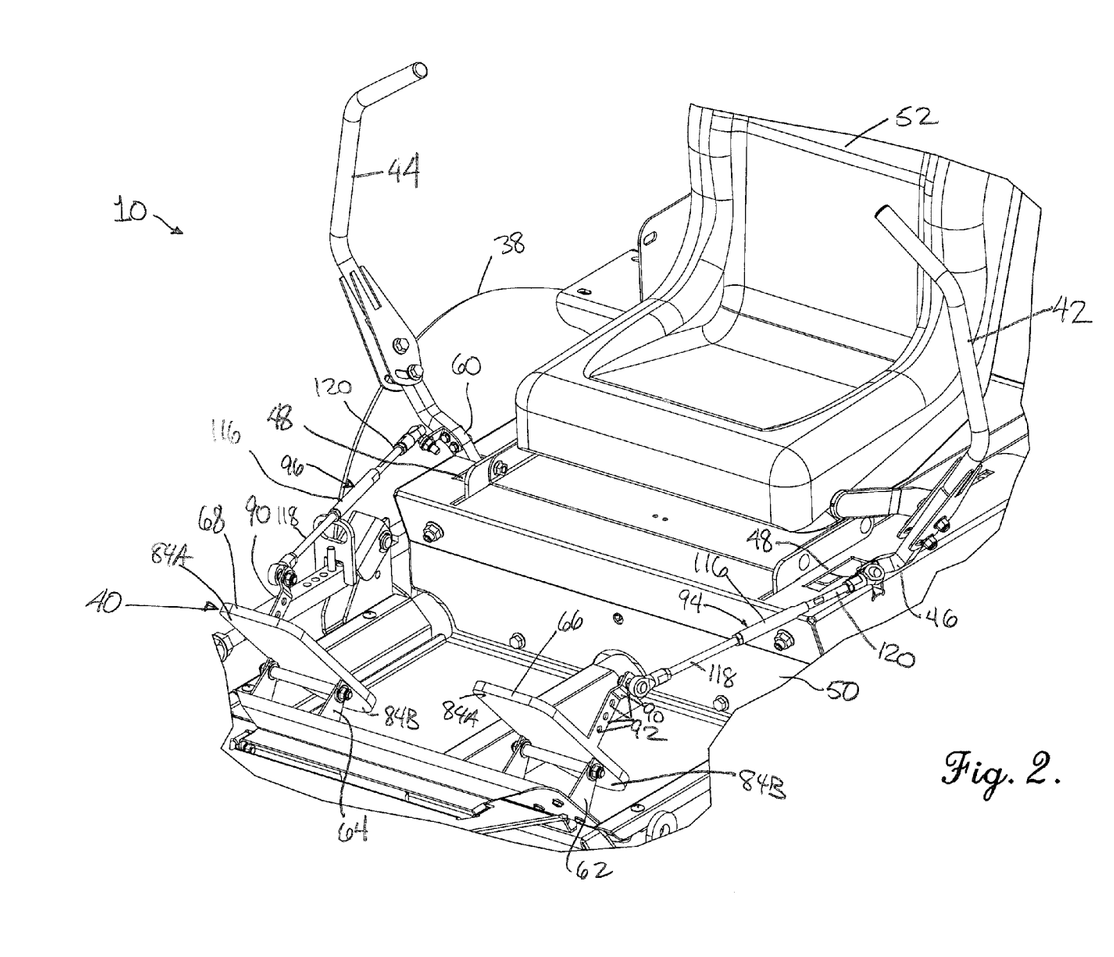
FIG. 2 is an enlarged fragmentary isometric view similar to FIG. 1, showing the operators control area of the mower and the drive and steering system hereof including control levers, control pedals and connecting links, with the control levers in respective outboard positions.
Figure 3:
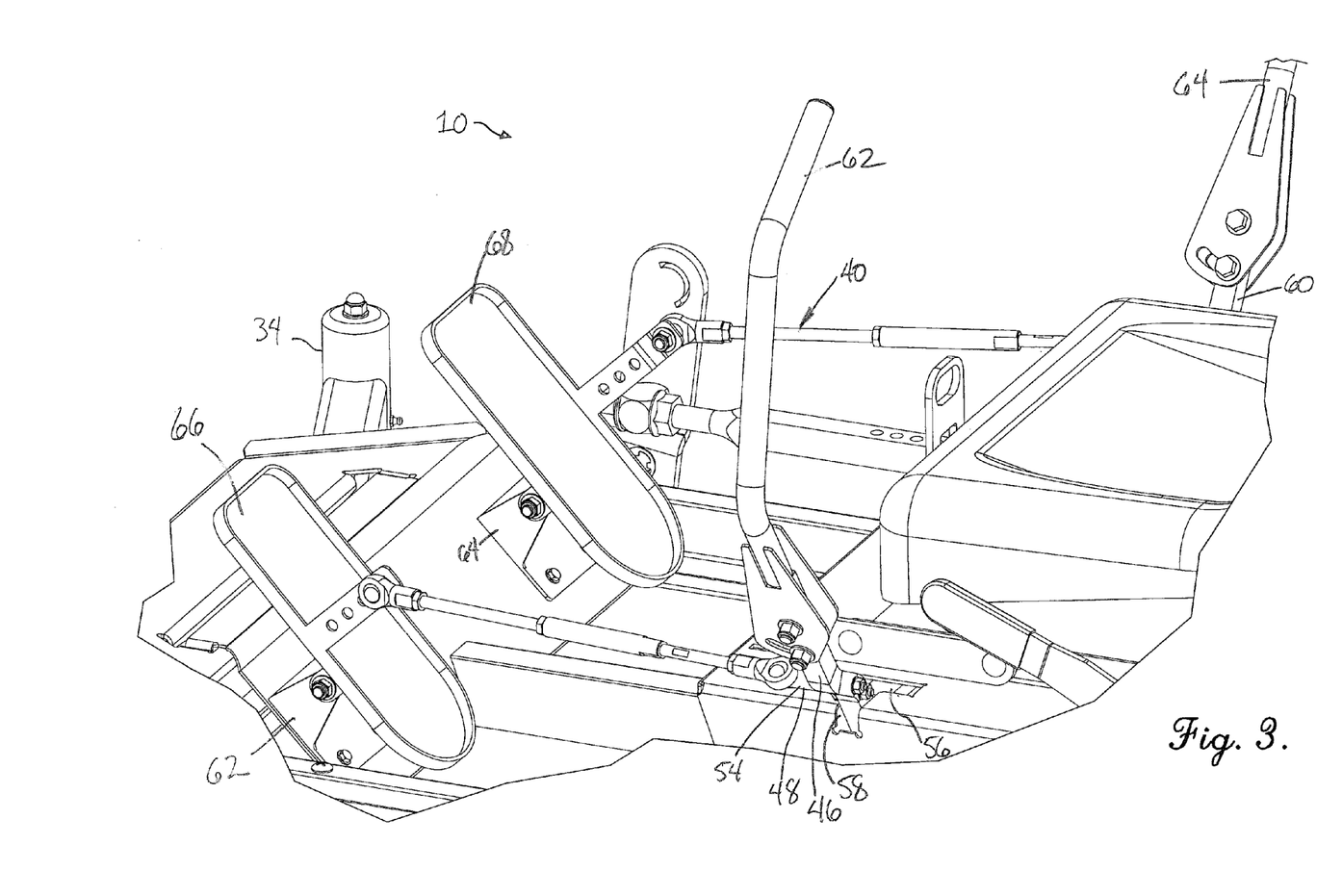
FIG. 3 is a further enlargement similar to FIG. 2 showing the control levers in their respective outboard positions, with the adjustable connecting links connecting the operating levers and the control pedals, as well as the pedal supports pivotally mounting the control pedals.
Figure 4:
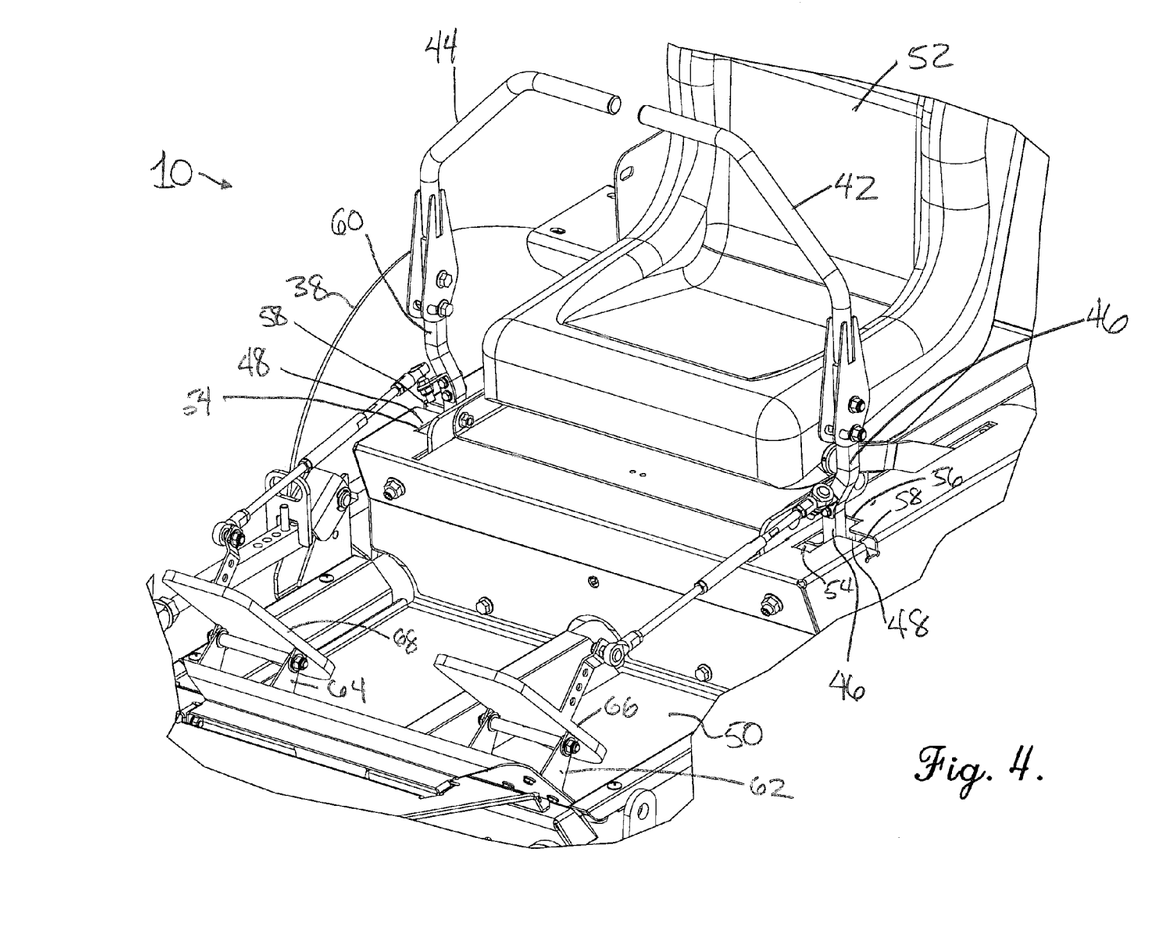
FIG. 4 is a view similar to that of FIG. 2, but showing the control levers in their inboard positions permitting forward and rearward shifting.

Referring now to the drawings, a zero turning radius mower 10 in accordance with the present invention includes a drivetrain system 12 which may include an internal combustion engine 14 which is connected by shafts, belts, pulleys and the like to a mowing deck 16. As shown in FIG. 1, the mowing deck 16 may be adjustably mounted to a frame 18 of the zero turning radius mower 10 and may have a protective guard 20 partially enclosing one, two or more rotary mower blades. The mowing deck 16 is typically provided with adjustable support structure which supports the rotary mower blades a desired distance above the ground over which the mower 10 is driven in order to cut the grass or other vegetation to a desired height, or lifted upwardly in order to clear obstacles when not in a cutting mode.

The zero turning radius mower 10 may include left and right idler wheel assemblies 22 and 24 which are typically positioned forwardly of the mowing deck 16 and are not steerable but rather include respective left idler wheel 26 and right idler wheel 28 each freely rotatable about generally horizontal axles defining respective generally horizontal axes on respective left and right carriages 30 and 32 which are pivotally mounted to the hollow housings 34 coupled to frame 18 such that each carriage 30, 32 may be free to pivot about respective upright axes. In addition, the drivetrain system 12 of zero turning radius mower 10 may include left drive wheel 36 and right drive wheel 38. The left and right drive wheels 36, 38 are independently driven and controlled for rotation either in a forward or rearward direction. That is, if the left drive wheel 36 rotates clockwise as viewed in FIG. 1, then this is the rearward direction, while counterclockwise rotation as viewed in FIG. 1 turns the left drive wheel 36 in a forward direction. Both of the left and right drive wheels 36, 38 are operatively coupled to the engine 14 through hydraulic pumps and/or motors as shown, for example, in U.S. Pat. No. 5,644,903, the entire disclosure of which is incorporated by reference. In such a drivetrain system 12, the engine 14 powers one or more hydraulic pumps which in turn are fluidically connected to respective hydraulic motors which drive the left and right drive wheels 36, 38 independently. By way of example, the engine 14 may be operatively connected to separate left and right hydraulic motors may be hydraulically and separately coupled by hydraulic conduits to a dual hydrostatic pump which has a separate pump for powering the respective hydraulic motor for each drive wheel. Each side of the dual hydrostatic pump provided with a swash plate for defining a pump stroke between a full forward and a full reverse position. Alternatively, such a drive system 12 may include an engine which is connected by a drive belt, shaft or other drive mechanism to an integrated hydrostatic transaxle wherein the hydrostatic transaxle may include a pump such as an axial piston pump and motor with gear reduction and integrated wheel drive units with gear reduction features. It is contemplated that the present invention might also be useful, for example, if the drive system included an electric generator and respective electric motors operatively connected to the left and right drive wheels or alternative drive systems. That is, the invention hereof has as one primary concern the ability to provide alternative foot operated control input to the drivetrain system 12 which drives each drive wheel 36, 38 independently of the other in a zero turning radius mower, not necessarily limited by the type of drive system employed.

Figure 5:
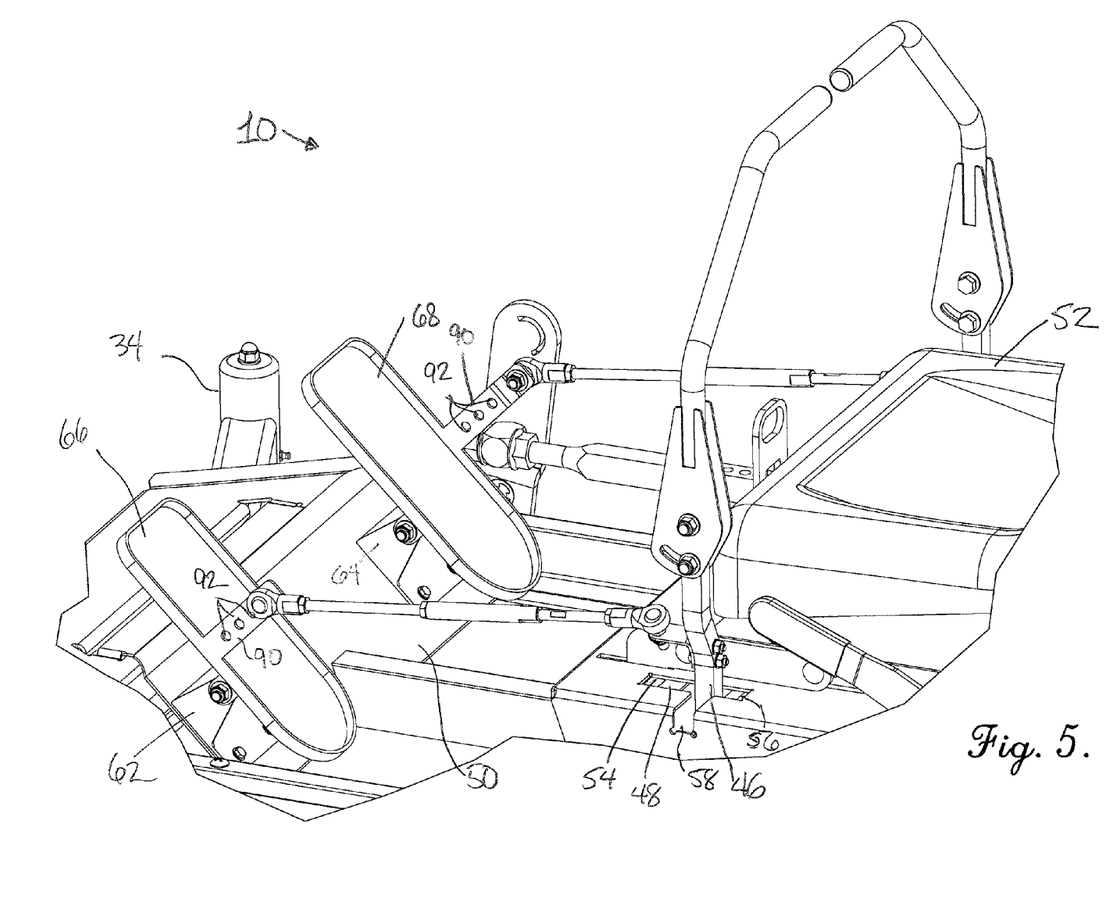
FIG. 5 is an enlarged view similar to that of FIG. 3, but showing the control levers in their inboard positions permitting forward and rearward shifting.
Figure 6:
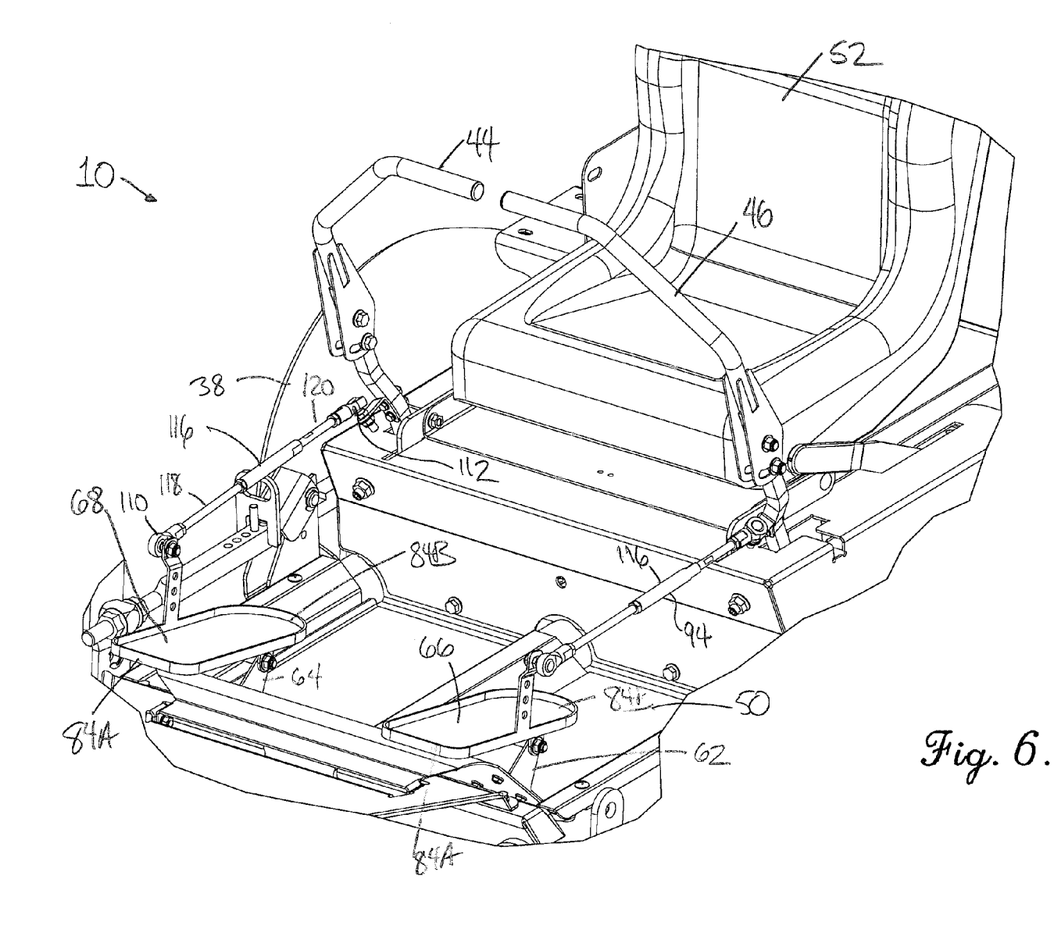
FIG. 6 is a view similar to that of FIGS. 2 and 4, with the control pedals pivoted forwardly and the control levers shifted forwardly for forward motion of the mower.
Figure 7:
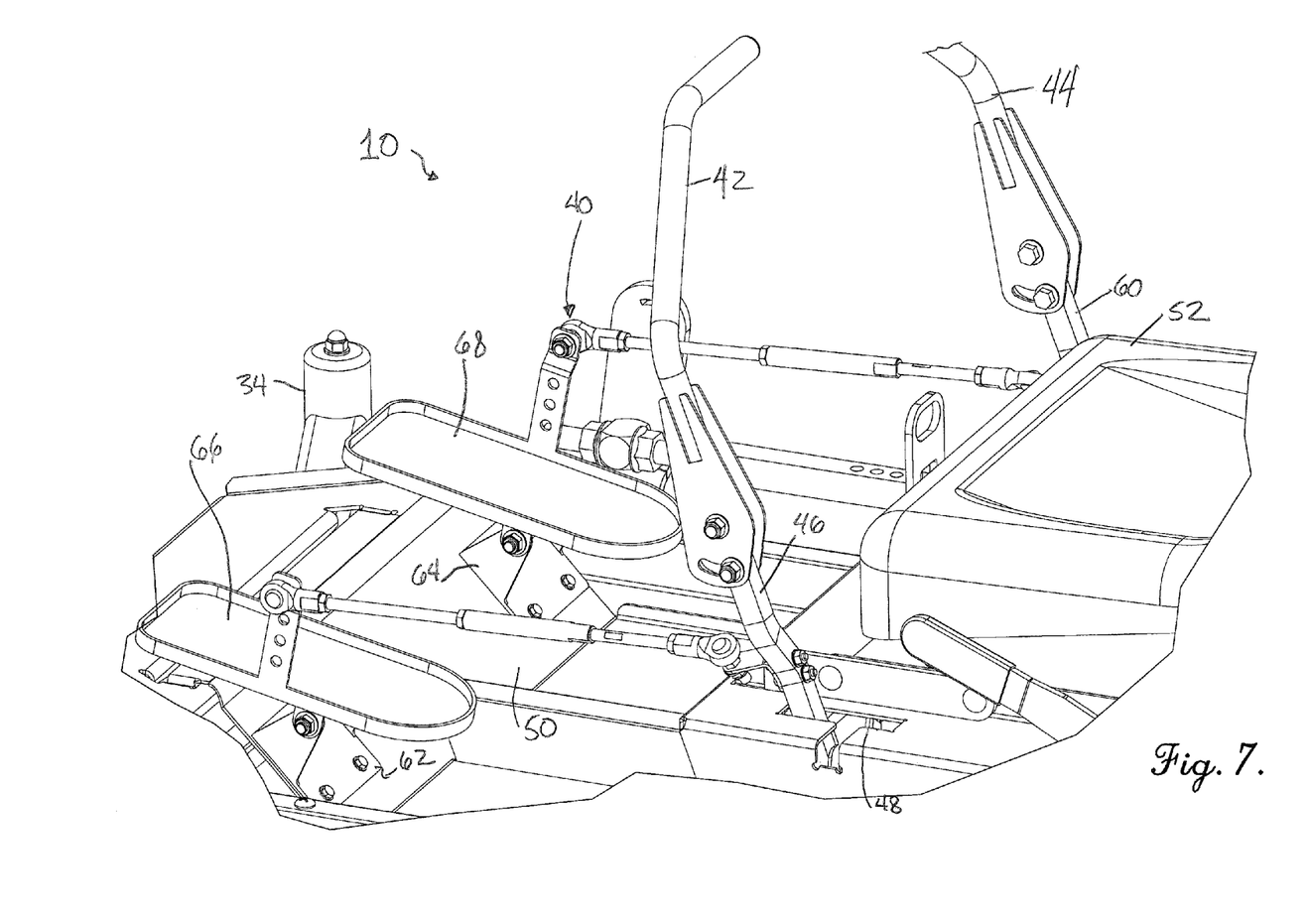
FIG. 7 is a view similar to that of FIG. 5, but showing the pedals and control levers in a forward position.
Figure 8:
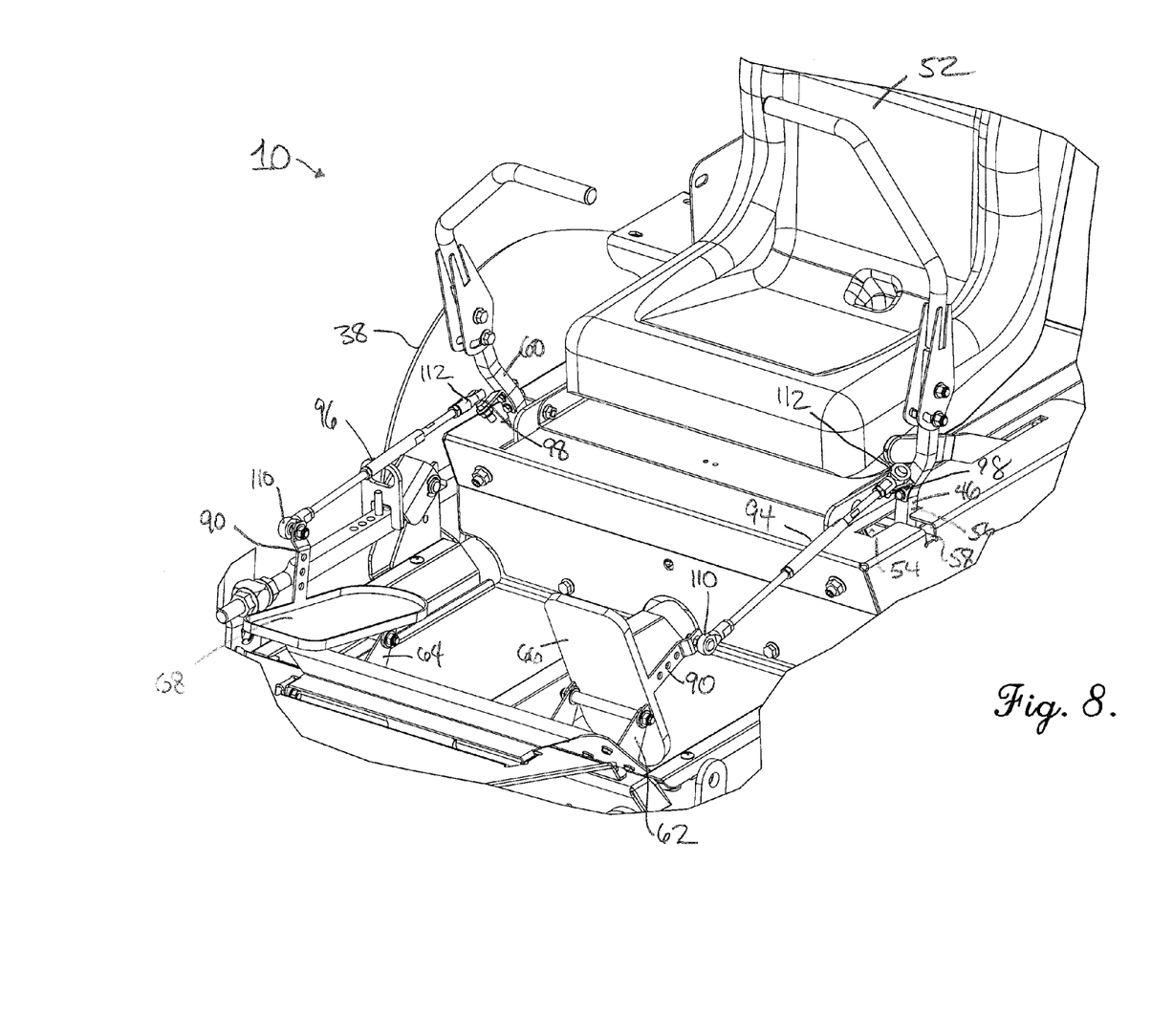
FIG. 8 is a view similar to that of FIGS. 2, 4 and 6, but showing the right control pedal and right control lever in a forward position with the left control pedal and left control lever in a rearward position to produce counterclockwise spinning of the mower about a vertical axis positioned between the drive wheels.
Figure 9:
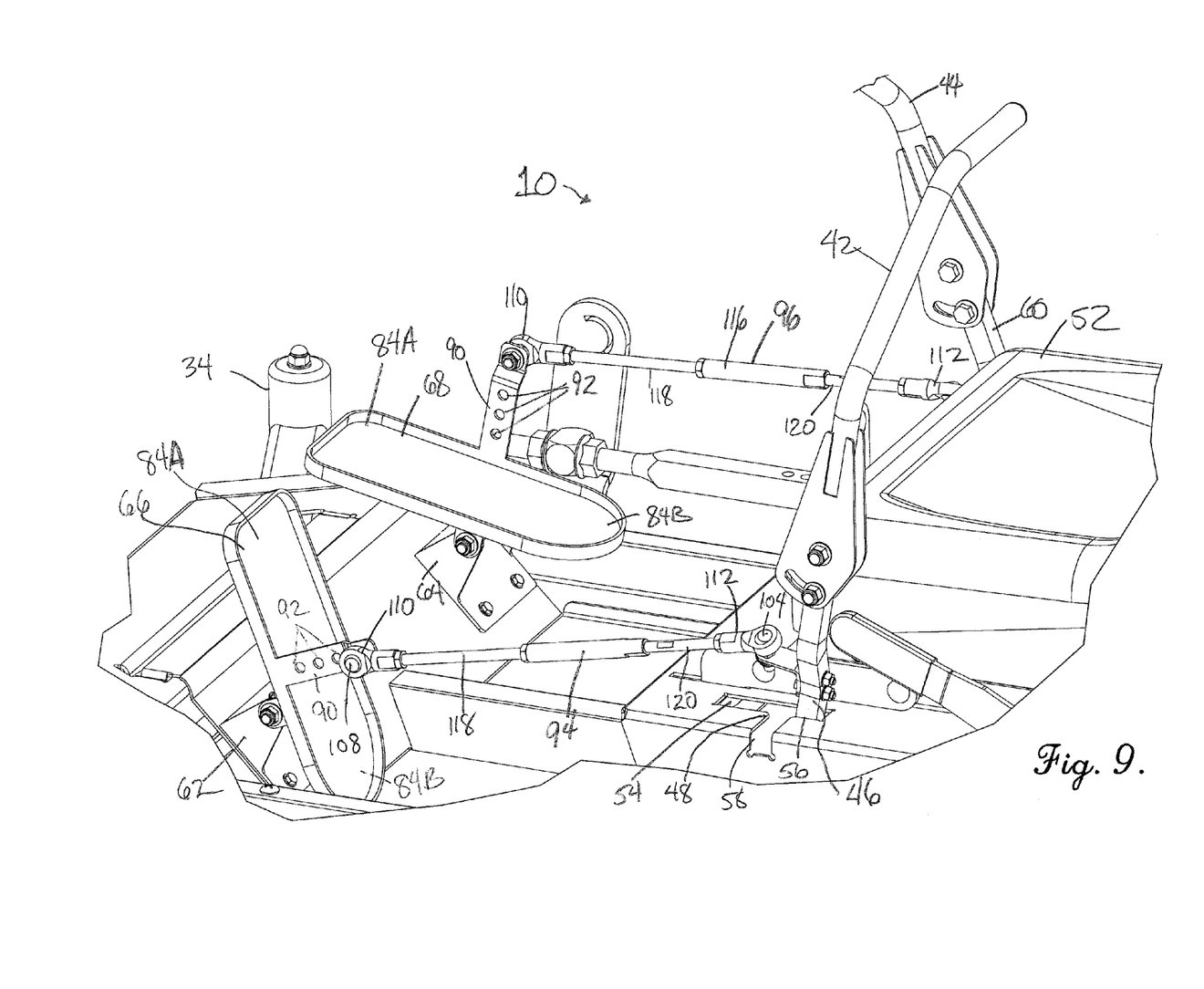
FIG. 9 is a view similar to that of FIG. 7, but showing the right control pedal and right control lever in a forward position with the left control pedal and left control lever in a rearward position to produce counterclockwise spinning of the mower about a vertical axis positioned between the drive wheels.

The dual steering system 40 of the present invention includes a left drive wheel control lever 42 which is operatively connected to the drivetrain system 12 for providing input to the left drive wheel 36, and a right drive wheel control lever 44 which is operatively connected to the drivetrain system 12 for providing input to the right drive wheel 38. Both the left drive wheel control lever 42 and the right drive wheel control lever 42 are preferably biased by springs (not shown) to a neutral position wherein the zero turning radius mower 10 is not propelled by the drivetrain system 12. The left drive wheel control lever 40 may include a left control lever standard 46 in order to permit position adjustment of the upper portion of the control lever relative to the standard 46, the standard 46 thus being a lower part of the lever 40 which may move within a T-shaped three-channel track 48 of the operator deck 50 positioned on the frame 18, an operator's seat 52 being positioned on the operator deck 50 substantially between the left drive wheel 36 and the right drive wheel 38. Preferably, the operator's seat 52 is slidably mounted on the operator deck for forward and rearward movement relative to the operator deck 50 to a desired position. The three-channel track 48 positioned on the left side of the operator deck 50 is best seen in FIG. 5 and acts as a guide whereby the left control lever standard 46 may be moved forwardly into a forward channel 54 for causing the left wheel to rotate to move the left side of the zero turning radius mower 10 in a forward direction, rearwardly into a rear channel 56 for causing the left wheel to rotate in the opposite direction to cause the left side of the zero turning radius mower to move rearwardly, and an outboard channel 58 into which the left control lever standard 46 may be moved to prevent rotation of the left drive wheel 36. The left control lever standard 46 may thus pivot laterally into the outboard channel 58 and may be biased by a spring (not shown) to reside in the outboard channel 58 so that when the left drive wheel control lever 40 is released by the operator, it is biased first to the neutral position and then into the outboard channel 58. Right drive wheel control lever 42 operates in the same manner and includes a right control lever standard 60 which also moves within a three-channel track 48 positioned adjacent the right side of the operator deck 50, the three-channel track which is oriented as a mirror image of the three-channel track 48 positioned on the left side of the operator deck as described above, having the same forward, rear and outboard channels. The three-channel tracks 48 may be provided help to limit the range of movement of the left and right drive wheel control levers 42 and 44 and their associated standards 46 and 60, but are optional and may be omitted or other structures performing a retaining or movement-limiting function may be used. For example, the left and right drive wheel control levers and/or their associated standards may be provided with lugs which are received in respective complementally sized openings in the frame or operator's deck to retain the left and right drive wheel control levers in a central, neutral (non-driving) position when the operator moves one or both of the drive wheel control levers outboard so that the lugs may be positioned in their respective openings.

In the present invention, respective left control pedal support 62 and right control pedal support 64 may be mounted by screws or other threaded fasteners to the operator deck 50 for respectively shiftably supporting a left control pedal 66 and a right control pedal 68. The left control pedal support 62 and the right control pedal support 64 as shown in the drawings are configured for pivotal shifting of their respective control pedals. The control pedal supports 62 and 64 are viewed in greater detail in FIG. 10 and each may include a base 70 configured for mounting to the operator deck 50 and having a pair of spaced-apart upright ears 72, 74 which mount an at least partially threaded rod 76 over which a sleeve 78 is positioned, with washers 80 and nuts 82 for securing the threaded rod 76 to the ears 72, 74. Each control pedal 66, 68 includes a footpad 84, a pair of spaced apart flanges 86, 88 extending downwardly from the bottom of the footpad 84 adjacent the sides of the footpad, and an upwardly extending bar 90 positioned preferably proximate the outboard edge (left edge for left control pedal 66, right edge for right control pedal 68) of the respective control pedal 64, 66. The ears 72, 74 and flanges 86, 88 each have a hole therethrough which is aligned for receiving the at least partially threaded rod 76 therethrough, with the sleeve 78 positioned between the ears 72, 74. The footpads 84 of each of the control pedals 66, 68 have a remote end 84A which is normally where the operator's toes would overlie and a proximate end 84B which is normally where the operator's heel would overlie, it being understood that each control pedal 64, 66 thus shifts or pivots about an axis defined by the passage of the at least partially threaded rod 76 through the hole in the ears 72, 74 and flanges 86, 88, such axis being intermediate the remote end 84A and the proximate end 84B. The at least partially threaded rod, when secured by the nuts 82, permits the respective pedal 66, 68 to shift, and in particular pivot, about an axis defined by the at least partially threaded rod 76. The bar 90 for each control pedal 66,68 may be provided with a plurality of spaced-apart holes 92 aligned along the length of the bar 90.

The dual steering system 40 hereof may further include adjustable left and right control pedal links 94 and 96 which operatively connect the control levers 42 and 44 with their respective control pedals 66 and 68, thereby allowing the control pedals 66 and 68 to be positioned on the operator deck 50 at a comfortable angle or at a comfortable distance from the operator's seat 52. The control levers 42 and 44 are each provided with a bracket 98 mounted by threaded fasteners such as bolts 100, screws or other fasteners to the respective standards 46, 60. A threaded shank ball-head coupler 104 may be provided and attached to the bracket 98 using bolts nuts 106 or other fasteners, with the shank of the coupler 104 generally aligned parallel to the long axis of the respective standard or potion thereof to which the bracket 98 is attached. A similar threaded shank ball-head coupler 108 may be mounted in one of the holes 92 of the bar 90 of each control pedal 66, 68 and secured by a nut 102. The left and right control pedal links 94 and 96 may each include similarly configured swivel heads 110 and 112 each complementally configured to receive and hold the ball heads 114 of the ball-head couplers 104 and 108. The left and right control pedal links may also include an internally threaded sleeve 116 which receives therein on each of each longitudinally spaced ends at least partially threaded rods 118 and 120. One threaded end of the at least partially threaded rods 118 and 120 are threaded into the respective adjacent swivel heads 110 and 112 and the other threaded end of the at least partially threaded rods 118 and 120 are threaded into the internally threaded sleeve 116 to the extent desired to provide a desired overall length of the respective control pedal link 94 and 96. Thus, the overall length of each of the left and right control pedal links 94 and 96 may be adjusted to provide a distance between the respective left and right drive wheel control lever 42 and 44 and the corresponding left and right control pedal 64, 66.

Figure 10:
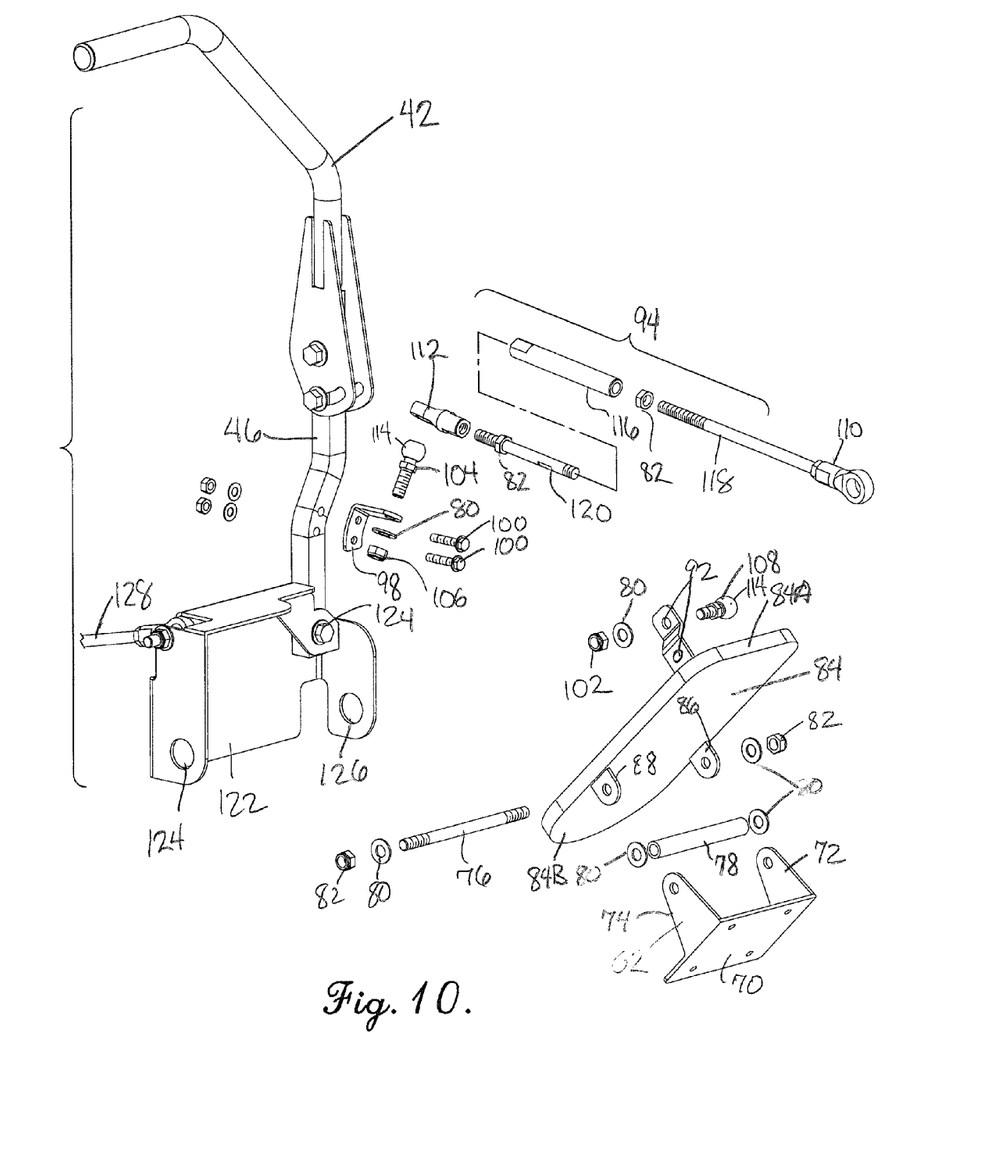
FIG. 10 is an enlarged exploded view of the left control lever, left control pedal, left control pedal support, and left control pedal link and coupling hardware to illustrate the components thereof, the right control pedal, right control lever, left control pedal support and left control pedal link being a mirror image thereof.

Each of the left and right drive wheel control levers 42 and 44 (to which the left and right control pedals 64,66 are operably connected by left and right control pedal links 94 and 96) are operably connected to the drivetrain system 12. While the particular manner of connection varies for different types and models zero turning radius mowers 10, FIG. 10 shows an example whereby a bracket 122 is provided for mounting the right drive wheel control lever 42 so that it may pivot about bolt 124 to an outboard position to reside within the outboard channel 58, or for steering the zero turning radius mower 10 the lever 42 may cause the bracket to rock or pivot about a shaft or bearings defining an axis and passing through openings 124 and 126. A portion of a control link 128 is shown and is pivotally mounted to the bracket 122. The control link 128 moves forwardly and rearwardly corresponding to forward and rearward movement of the respective left or right drive wheel control lever 42, 44 and consequent pivoting of the bracket 122 to transmit the operator's input to operate the motors in the drivetrain system 12 in forward or rearward rotation for corresponding independent driving of each of the left and right drive wheels 36, 38.

Prior to use of the zero turning radius mower 10, the operator may adjust the operator seat 52 forwardly or rearwardly to the desired position so that the operators' feet are comfortably positioned to rest on and operate the left and right control pedals 64, 66. The operator may also adjust the relative angle of the control pedals 64, 66 for optimizing comfort during use by attaching the ball-head coupler 108 in a desired one of the spaced-apart holes 92 in the bar 90 of each control pedal 64, 66. In addition or alternatively, the operator may adjust the length of each of the left and right control pedal links 94 and 96 by loosening the nuts 92 on the at least partially threaded rods 118 and 120, turning the internally threaded sleeve 116 which increases or decreases the extent to which the partially threaded rods 118 and 120 are received in the internally threaded sleeve 116 and then re-tightening the nuts 92.

The zero turning radius mower 10 is thus capable of operation and steering using either the operator's arms and hands only as is conventional, or the use of the operator's feet only, or a combination of hands and feet. That is, the dual steering system 40 hereof still enables operation of the zero turning radius mower 10 in a conventional manner whereby the operator may grasp the left drive wheel control lever 42 and the right drive wheel control lever 44, both of which are operatively connected to the drive system 12, and by pushing or pulling on the levers, drive and steer the zero turning radius mower in a conventional manner. However, for those operators which suffer from an inability to grasp the left and/or right drive wheel control levers 42, 44 through loss of use of their hands and/or anus, the dual steering system 40 hereof enables the zero turning radius mower to be operated by the feet only. The operator places his or her feet in the respective left and right control pedals 64 and 66, and after the engine 14 is engaged and in operation, steers the zero turning radius mower by use of the pedals 64, 66. To cause either drive wheel 36, 38 to rotate and move that side of the zero turning radius mower to move forwardly, the operator applies pressure or force against the remote end 84A of the footpad 84 of the desired one (or both) of control pedals 64,66; to cause either drive wheel 36, 38 to rotate and move that side of the zero turning radius mower to move rearwardly, the operator applies pressure or force against the proximate end 84B of the footpad 84 of the desired one (or both) of control pedals 64, 66. The bar 90, being positioned proximate the remote end 84A of the footpad and thus shifting when the corresponding control pedal shifts, i.e. pivots, the control pedal movement causes corresponding translational movement of the respective control pedal link 94, 96, and consequent movement of the respective drive wheel control lever 42, 44 and thereby actuates the drivetrain system 12 via the corresponding control link 128. Beneficially, the use of ball heads on the couplers and swivels provides spheroidal coupling which enables the control pedal links 94, 96 not to pivot about a single axis relative to the respective control pedals 64, 66 and the respective drive wheel control levers 42, 44, but also to pivot about more than one axis so that, for example, when the drive wheel control levers 42, 44 are shifted to an outboard position such as in the outboard channels 58, the connection between the control pedal links 94, 96 and the drive wheel control levers 42, 44 does not bind and allows lateral movement of the drive wheel control levers 42, 44. The adjustment features of the several holes 92 in the bars 90 of the control pedals 64 and 66 and the ability to adjust the length of the control pedal links 94 and 96 permit easy adjustment for different operators or when a change in the operating position of the control pedals, for example due to movement of the operator's seat, would be beneficial.

The dual steering system 40 hereof does not disable or alter the operation of a zero turning radius mower as originally equipped with hand lever steering only. Thus, it may be readily installed as an aftermarket accessory to permit operators who have lost the use of one or both arms to continue to operate their zero turning radius mower. As such, it has the additional benefit of allowing an operator to initially use only their arms to steer the zero turning radius mower in the conventional manner, and then, if the operator becomes fatigued, the operator may elect to steer with his or her legs and feet. Where an operator has arthritis or other conditions which permit some use of his or her arms but not sufficient to operate and steer a zero turning radius mower, the present invention permits the use of the operators legs and feet using the control pedals 64 and 66 in combination with the drive wheel control levers 42, 44. Thus, the present invention offers a number of unexpected opportunities and benefits not contemplated by conventional zero turning radius mowers.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of his invention as pertains to any apparatus not materially departing from but outside the literal scope of the invention as set out in the following claims.

The invention claimed is:

1. A dual steering system for zero turning radius mower comprising:
   a left drive wheel control lever operatively connected to a left mower drive wheel;
   a right drive wheel control lever operatively connected to a right mower drive wheel;
   a left control pedal support mounted to the mower;
   a left control pedal shiftably mounted to the left control pedal support;
   a right control pedal support mounted to the mower;
   a right control pedal shiftably mounted to the right control pedal support;
   a left control pedal link pivotally coupled to said left control pedal and also pivotally coupled to said left drive wheel control lever, whereby shifting of said left control pedal causes corresponding movement of said left drive wheel control lever to operate the left mower drive wheel; and
   a right control pedal link pivotally coupled to said right control pedal and also pivotally coupled to said left drive wheel control lever, whereby shifting of said left control pedal causes corresponding movement of said left drive wheel control lever to operate the left mower drive wheel.

2. A dual steering system for a zero turning radius mower as set forth in claim 1, wherein the left control pedal is pivotally mounted to the left control pedal support and the right control pedal is pivotally mounted to the right control pedal support.

3. A dual steering system for a zero turning radius mower as set forth in claim 2, wherein each the left control pedal and the right control pedal include a plurality of alternate locations for pivotal coupling of the left control pedal link and right control pedal link, respectively.

4. A dual steering system for a zero turning radius mower as set forth in claim 1, wherein each of the left control pedal link and right control pedal link include a member for adjusting the longitudinal length of the respective control pedal link.

5. A dual steering system for a zero turning radius mower as set forth in claim 4, wherein the adjusting member includes a threaded member.

6. A dual steering system for a zero turning radius mower as set forth in claim 5, wherein the threaded member includes an internally threaded sleeve and at least one threaded rod received in said sleeve.

7. A dual steering system for a zero turning radius mower as set forth in claim 1, wherein each of the left control pedal link and right control pedal link are coupled respectively to the left control pedal and right control pedal by a connection permitting pivoting about more than one axis.

8. A dual steering system for a zero turning radius mower as set forth in claim 7, wherein the connection permitting pivoting about more than one axis includes a ball head coupler mounted to each the left control pedal and the right control pedal and a swivel head located on each said left control pedal link and said right control pedal link for enabling ball and socket swivelling of said left and right control pedal links relative to their respective control pedals.

9. A dual steering system for a zero turning radius mower as set forth in claim 1, wherein the left drive wheel control lever is coupled to the left control pedal link for enabling pivotal movement of the left drive wheel control lever from a neutral position both forward from said neutral position, rearward away from said neutral position, and laterally from said neutral position to an outboard position.

10. In a zero turning radius mower having a mower deck, left and right substantially parallel, laterally spaced and independently rotatable drive wheels and left and right control levers operatively coupled for respectively rotating each of said drive wheels in a clockwise or counterclockwise direction of rotation, the improvement comprising:

a left control pedal support mounted to the mower;
a left control pedal shiftably mounted to the left control pedal support;
a right control pedal support mounted to the mower;
a right control pedal shiftably mounted to the right control pedal support;
a left control pedal link pivotally coupled to said left control pedal and also pivotally coupled to said left drive wheel control lever, whereby shifting of said left control pedal causes corresponding movement of said left drive wheel control lever to operate the left mower drive wheel; and
a right control pedal link pivotally coupled to said right control pedal and also pivotally coupled to said left drive wheel control lever, whereby shifting of said left control pedal causes corresponding movement of said left drive wheel control lever to operate the left mower drive wheel.

11. A zero turning radius mower as set forth in claim 10, wherein the left control pedal is pivotally mounted to the left control pedal support and the right control pedal is pivotally mounted to the right control pedal support.

12. A zero turning radius mower as set forth in claim 10, wherein each the left control pedal and the right control pedal include a plurality of alternate locations for pivotal coupling of the left control pedal link and right control pedal link, respectively.

13. A zero turning radius mower as set forth in claim 10, wherein each of the left control pedal link and right control pedal link include a member for adjusting the longitudinal length of the respective control pedal link.

14. A zero turning radius mower as set forth in claim 13, wherein the adjusting member includes a threaded member, and wherein the threaded member includes an internally threaded sleeve and at least one threaded rod received in said sleeve.

15. A zero turning radius mower as set forth in claim 10, wherein each of the left control pedal link and right control pedal link are coupled respectively to the left control pedal and right control pedal by a connection permitting pivoting about more than one axis.

16. A zero turning radius mower as set forth in claim 10, wherein each of the left control pedal link and right control pedal link are coupled respectively to the left control pedal and right control pedal by a connection permitting pivoting about more than one axis.

17. A zero turning radius mower as set forth in claim 10, wherein the left drive wheel control lever is coupled to the left control pedal link for enabling pivotal movement of the left drive wheel control lever from a neutral position both forward from said neutral position, rearward away from said neutral position, and laterally from said neutral position to an outboard position.

18. A method of driving and steering a zero turning radius mower having a mower deck and a drive and steering system including a self-contained power source operatively connected to left and right substantially parallel, laterally spaced and independently rotatable left and right drive wheels and left and right drive wheel control levers operatively coupled for respectively rotating each of said drive wheels in a clockwise or counterclockwise direction of rotation and left and right control pedals operatively respectively connected to said left and right control levers, the method comprising the steps of:

applying a force to said left control pedal alone or in combination with a force applied to said left drive wheel control lever to cause corresponding rotational movement of said left drive wheel; and
applying a force to said right control pedal alone or in combination with a force applied to said right control lever to cause corresponding rotational movement of said right drive wheel.

19. A method of driving and steering a zero turning radius mower as set forth in claim 18, wherein the force applied to the left control pedal is transmitted to the left drive wheel control lever via a mechanical link and wherein the force applied to the right control pedal is transmitted to the right drive wheel control lever via a mechanical link.

20. A method of driving and steering a zero turning radius mower as set forth in claim 18, wherein the left and right control pedals each include a remote end and a proximate end, wherein the pedals are independently pivotally mounted to a deck of the zero turning radius mower, and wherein the application of force to the remote end of one of the left and right control pedals causing forward pivoting of the remote end of said one of the control pedals from a neutral position causes corresponding forward rotation of the respective left or right drive wheel and the application of force to the proximate end of said one of the left and right control pedals causing rearward pivoting of the remote end of said one of the control pedals from a neutral position causes corresponding rearward rotation of the respective left or right drive wheel.

* * * * *